March 17, 1936.                L. C. MARTIN                2,034,406

OPHTHALMIC MOUNTING

Filed March 21, 1934

Inventor:
Laurence C. Martin
By
Pennington and White
Attorneys.

Patented Mar. 17, 1936

2,034,406

UNITED STATES PATENT OFFICE 2,034,406

OPHTHALMIC MOUNTING

Laurence C. Martin, Providence, R. I., assignor to Martin-Copeland Company, a trusteeship consisting of Edgar W. Martin, Barrington, and Laurence C. Martin, Providence, R. I., and George W. Bleecker, Chicago, Ill.

Application March 21, 1934, Serial No. 716,610

1 Claim. (Cl. 88—47)

This invention relates to ophthalmic mountings and particularly to an improved method and means for securing nose-pieces or bridges and temples to the lenses of rimless eyeglasses and spectacles.

One object of the invention is to provide an improved method for securely connecting ophthalmic mountings to the lenses of eyeglasses with means for maintaining the connection firm and rigid to prevent play and movement of the mountings with respect to the lenses.

Another object of the invention is to provide securing means for the purpose indicated which enable the mountings to be easily and quickly applied to the lenses without requiring threaded connections or riveted joints or the use of special tools.

Another object of the invention is to provide securing means of the type indicated employing a novel form of pin which may be inserted through alined holes in the lens and mounting and cemented or soldered to the mounting.

Another object of the invention is to provide securing means of the type indicated having a connecting pin slightly smaller than the alined holes in the mounting and lens to provide that when the joint is heated cement or solder placed in the hole of the lens will flow along the pin and into the hole in the mounting to effectively secure the pin thereto.

Another object of the invention is to provide securing means of the type indicated which is simple in construction, neat and finished in appearance, and generally more efficient for the purpose specified.

Further objects of the invention are set forth in the following specification which describes a preferred form of construction of the improved securing means, by way of example, as illustrated by the accompanying drawing. In the drawing.

In attaching the nose-piece or bridge to the lenses of rimless eyeglasses, and also in connecting the temples to the lenses of spectacles, it is customary to provide the mountings having straps straddling the opposite sides of the lenses and perforated with holes through which a screw is inserted to extend through a hole in the glass. Usually, the hole in one strap is threaded to engage the threads of the screw and an arcuately-shape shoe, disposed between the straps, engages against the edge of the lens to prevent the mounting from turning on the screw.

The fittings or mountings for the eyeglasses are generally sold separately as findings and the work of attaching them to the lenses is done by the optician who fits the glasses to the eyes of the user. It frequently occurs that when the screw is inserted through the hole and tightened in place the lens is broken and must be replaced. When binding screws of this type are employed they soon become loosened in use to cause shackly joints and are liable to drop out of place. It is therefore a principal object of the present invention to provide a method and means for securely attaching the mountings or fittings to the lenses without dependence on screws or similar fastening means liable to work loose or to become worn and inefficient in use.

To accomplish this result the present invention provides means comprising a pin for attaching the mounting in place on the lens and a novel method of cementing or soldering the pin in place. A preferred form of construction of the improved securing means is shown in the accompanying drawing as hereinafter described in detail.

Figure 1:
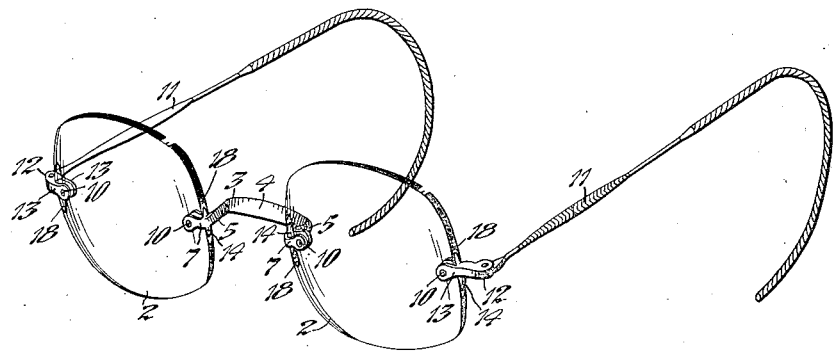
Fig. 1 is a perspective view of a pair of rimless spectacles showing the mountings for the nose-piece or bridge and the temples secured to the lenses by the present improved means.
Figure 2:
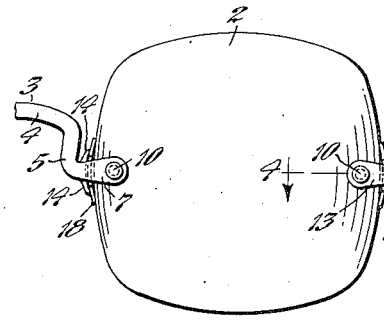
Fig. 2 is an enlarged front view of one of the lenses showing the mountings attached thereto by the present improved securing means.
Figure 3:
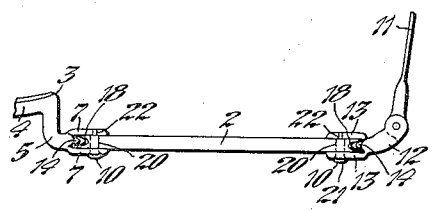
Fig. 3 is an edge view of the lens and mountings.

Referring to Fig. 1 of the drawing, the pair of spectacles illustrated comprises lenses 2 joined together by a bridge or nose-piece 3. The nose-piece 3 is shown as having a curved crossbar 4 with opposite parallel arms 5 extending forwardly therefrom. At the ends of the arms 5 are right-angled portions terminating in opposite, spaced straps 7 which overlap the sides of the lenses 2 and are secured thereto by means of pins 10, to be later described, passing through holes in the straps 7 and the lenses 2.

Figures 4, 5:
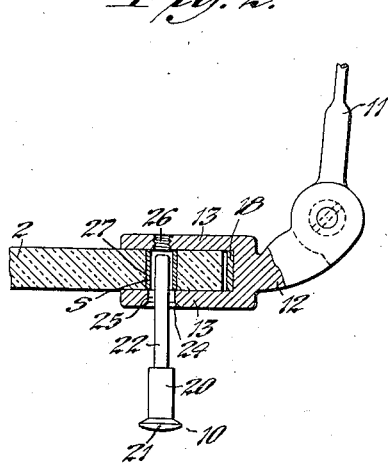
Fig. 4 is a further enlarged part-sectional view of the mounting taken on line 4—4 of Fig. 2 and illustrating the method of assembling it on the lens.
Fig. 5 is a similar view showing the parts in completely assembled relationship.

The temples 11 of the spectacles are attached to the outer rims of the lenses 2 in substantially the same manner, the mountings or end-pieces 12 having opposite straps 13 straddling the sides of the lenses and secured thereto by the pins 10. The present improved attaching or securing means is adapted for use with either type of mounting, Figs. 4 and 5 illustrating it in detail as employed with the mounting or end-piece 12 for the temple 11. The straps 7 and 13 of the fittings 3 and 12, respectively, are provided with arcuate shoes 14 spaced at a slight distance from the edges of the lenses 2. Auxiliary shoes or spring-members 18, such as shown and described in United States Letters Patent No. 1,885,014 granted October 25, 1932, to Bror J. Jacobson, are inserted between the rigid shoes 14 and the edges of the lenses. The auxiliary shoes 18 act resiliently to maintain the mountings in firm connection with the lenses to prevent loose and shackly joints. It is to be understood, however, that the present improved connecting means may be employed with other types of mountings.

Referring now to Figs. 4 and 5, the pin 10, previously referred to as constituting the means for securing the mounting 12 to the lens 2, comprises a main cylindrical body or shank 20 formed at one end with a rounded head 21 and at the opposite end with a reduced axial extension or stem 22 of considerable length. The head 21 may be engraved or struck up with a suitable design on its outer face to harmonize with the mounting to which it is applied.

The opposite straps 13 of the member 12 are provided with the usual alined holes 25 and 26. The hole 25 is of a size adapted to receive the larger body portion 20 of the pin 10 while the hole 26 is smaller to accommodate the stem 22 thereof. Usually, the hole 25 is countersunk at 24. In accordance with the common practice the hole 26 is threaded to receive the end of the usual lens-screw but this is not essential to the purpose of the present invention. Whether the hole 26 is threaded or smooth, the stem 22 of the pin 10 is made slightly smaller in diameter than the hole to provide a free fit therein. The body portion 20 of the pin 10 is proportioned to provide a close fit in the larger hole 25 of the mounting. The lens 2 of the spectacles has the usual screw hole 27 which may be slightly larger than the hole 25 in the mounting 12. The improved method of attaching the fitting or mounting 12 to the lens 2 is as next explained.

A suitable cement or, preferably, solder containing a flux is first applied to the sides of the hole 27 in the lens 2 in the manner indicated at s in Fig. 4. The cement or solder may be of any suitable compound as commonly used for similar purposes and its composition is therefore not herein specified. After applying the cement the mounting 12 is placed in position with its straps 13 straddling the sides of the lens 2 and its holes 25 and 26 in axial alinement with the hole 27 in the lens; the auxiliary shoe or spring-member 18 on the mounting being placed against the edge of the lens and held under compression.

With the mounting 12 held in place on the lens 2 against the tension of the spring 18 the securing pin 10 is inserted through the holes 25, 27 and 26 in the manner illustrated in Fig. 4. As the pin 10 is slid into place its reduced portion or stem 22 enters the hole 26 of the mounting 12 and is projected therethrough carrying a portion of the cement with it. The body portion 20 of the pin enters the hole 25 in the opposite strap portion 13 and is projected through the hole 27 of the glass. As the pin 10 is pushed into place its beveled head 21 seats in the countersunk end of the hole 25 in the outer side of one strap 13, while its body portion 20, being of less length than the combined thickness of the lens and strap 13, falls short of the opposite strap. That is to say, the body portion of the pin is so proportioned in length as to prevent its shouldered end from engaging the opposite strap portion of the mounting. In this way provision is made for variations in the thickness of the lenses so that the opposite strap portions of the mounting will not be spread apart, but will fit snugly against the sides of the lens.

With the strap portions 13 pressed tightly against the sides of the lens 2 and the pin 10 pushed through the holes with its head abutting the side of the mounting, heat is applied with a blow-torch or other suitable means. The heat causes the solder s or other cement to flow along the pin 10 to surround its stem 22 in the hole 26 and to fill the grooves of the threads thereof as shown in Fig. 5. After cooling the cement or solder solidifies to form a strong, permanent bond between the pin and the mounting. When the hole 26 is threaded, as herein shown, the cement or solder adheres to the threads to further strengthen the bond.

As shown in Figs. 4 and 5, the reduced stem 22 of the pin 10 is made relatively long to provide a convenient grip for the fingers or pliers in picking it up and assembling it in the mounting. This added length also guards against loss of the pin due to minuteness. After the parts are assembled in the manner as above explained, the projecting portion of the stem 22 of the pin 10 is cut off close to the side of the mounting 12 and the end filed down to provide a smooth finish.

It will be observed from the foregoing that the present invention provides a particularly simple yet efficient method and means for securing ophthalmic mountings to the lenses of eyeglasses and spectacles. The securing pin may be conveniently applied and cemented in place by the simple operation of heating the joint and after the cement or solder becomes set or solidified a firm and rigid joinder of the parts is effected. The cement is preferably of a frangible nature to provide for the convenient removal of the pin when it is desired to disconnect the parts for the purpose of changing the lenses. Should it be required to remove the mounting for repair or replacement of the lens this is readily accomplished by heating the joint to melt the solder or cement, after which the pin 10 may be pushed out or withdrawn with pliers.

The securing pin is inexpensive to manufacture and may be readily assembled in place by the optician who fits the glasses to the wearer. Moreover, the device may be applied to use with ophthalmic mountings now in use without alteration in the structure thereof. The complete mounting has a neat and finished appearance, while being much more efficient in use for the reasons specified.

While I have herein described and illustrated the invention as embodied in a preferred form of construction, it is to be understood that various modifications may be made in the structure and arrangement of the parts of the device and in the method of securing the parts together without departing from the spirit or scope of the appended claim. I claim:

As a new article of manufacture, an ophthalmic mounting for rimless eyeglasses and spectacles consisting in a strap member having portions adapted to straddle the sides of a lens and formed with axially aligning holes, one of said holes being smaller than the other and formed with indentations on its interior, said lens having a hole adjacent its rim larger than the holes in the strap and adapted to align therewith, a pin extending through the aligned holes in the strap and lens and having a body portion of substantially the size of the larger hole in the strap member with a head at its end and a stem of lesser diameter projecting from the opposite end of the body, said stem being of less diameter than the hole through which it extends to provide an annular space therebetween, and a bond of cement of stepped annular form in the opening between the pin and lens and the opening between the stem and strap portion through which it extends to bond the parts securely together with a rigid joint.

LAURENCE C. MARTIN.